United States Patent
Su et al.

(10) Patent No.: US 9,824,452 B2
(45) Date of Patent: Nov. 21, 2017

(54) TOPOGRAPHICAL MEASUREMENT SYSTEM OF SPECULAR OBJECT AND TOPOGRAPHICAL MEASUREMENT METHOD THEREOF

(71) Applicant: National Sun Yat-sen University, Kaohsiung (TW)

(72) Inventors: Wei-hung Su, Kaohsiung (TW); Bo-chin Huang, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 31 days.

(21) Appl. No.: 15/150,449

(22) Filed: May 10, 2016

(65) Prior Publication Data
US 2017/0186168 A1   Jun. 29, 2017

(30) Foreign Application Priority Data
Dec. 29, 2015   (TW) .............................. 104144207 A (51) Int. Cl.
G06K 9/00   (2006.01)
G06T 7/00   (2017.01)
G01B 11/25   (2006.01)

(52) U.S. Cl.
CPC .......... *G06T 7/0057* (2013.01); *G01B 11/254* (2013.01); *G06T 7/0055* (2013.01); *G06T 7/0065* (2013.01)

(58) Field of Classification Search
CPC ... G06T 7/0057; G06T 7/0065; G06T 7/0055; G06T 7/401; G01B 11/254; G01B 11/303; G01N 21/57; G01N 2021/8887; G01N 21/88

USPC .......................................................... 382/108
See application file for complete search history.

(56) References Cited

U.S. PATENT DOCUMENTS

| | | | |
|---|---|---|---|
| 2003/0197871 A1* | 10/2003 | Groot ................. | G01B 11/2441 356/497 |
| 2007/0217042 A1* | 9/2007 | Kweon ................. | G02B 5/10 359/850 |
| 2009/0073254 A1* | 3/2009 | Li ......................... | G03B 17/00 348/36 |
| 2015/0029514 A1 | 1/2015 | Wang et al. | |
| 2015/0153161 A1 | 6/2015 | Ohta | |
| 2016/0054119 A1 | 2/2016 | Kanto | |

FOREIGN PATENT DOCUMENTS

| TW | 201439499 A | 10/2014 |
|---|---|---|
| TW | 1471522 B | 2/2015 |

OTHER PUBLICATIONS

Projected Fringe Profilometry Techniques Using for Specular Surfaces, 2014.

* cited by examiner

*Primary Examiner* — Gregory F Cunningham
(74) *Attorney, Agent, or Firm* — Mark M. Friedman (57) ABSTRACT

A topographical measurement system of a specular object and a topographical measurement method thereof are disclosed. The topographical measurement system has a screen, an image capturing device, and an image processing device. The specular object reflects a fringe pattern from the screen, so as to form a virtual image of the fringe pattern. The virtual image is therefore analyzed to obtain a surface profile of the specular object.

16 Claims, 10 Drawing Sheets

TOPOGRAPHICAL MEASUREMENT SYSTEM OF SPECULAR OBJECT AND TOPOGRAPHICAL MEASUREMENT METHOD THEREOF

CROSS REFERENCE TO RELATED APPLICATIONS

This application claims the priority of Taiwan Patent Application No. 104144207, filed on Dec. 29, 2015. This invention is partly disclosed in a thesis entitled "Projected Fringe Profilometry Techniques Using for Specular Surfaces" on Jun. 30, 2015 completed by Wei-Hung Su and Huang Bo-Chin.

FIELD OF THE INVENTION

The present invention relates to a topographical measurement system for an object and a topographical measurement method thereof, and more particularly to a topographical measurement system for a specular object and a topographical measurement method thereof according a non-scanning method to describe the 3D profile of a metal surface.

BACKGROUND OF THE INVENTION

The application of optical topography measurement technology is increasing with the rapid development of science and technology, and more applications are developed in different industries. For example, the technology can be used for preliminary identification of defects in the semiconductor industry, and the accuracy of the micro-structure of the surface also affects the effectiveness of the product. The technology can be also used for detecting the contour surface of biological cells, or used as an endoscope to observe the situation in the human body. The technology can be also used for identifying the outer shape of a fuselage, wings, and propeller in the aerospace industry.

The traditional technologies of topographical measurement can be divided into a contact technology and a non-contact technology. The measurement of the contact technology is that an object is scanned by a probe with a high accuracy measurement. The probe contacts with the surface of the object directly in the measurement, and the surface of the object or the probe could be damaged. In measurements using the non-contact technology, such as Maike Sen interferometer, stereoscopic method (dual-view, multi-view) and Near-field scanning optical microscope with Confocal Microscopy, can be also used for detecting objects curvature, shape, and roughness without contacting with the surface of the object, and the surface of the object could not be damaged.

However, there are some defects in the structured light projection technology, fringe projection technology, and other interferences. The structured light projection technology and the fringe projection technology are suitable for detecting the objects with diffusing effect. For a specular object, only the light reflected from some part of the surface can be projected onto the image capturing device to form an image, but the light reflected from the other parts of the surface cannot be projected to form the image, thus the data of a part of the image is lost. Furthermore, the strength of the reflected light projected onto the image capturing device is generally excessive, so that the gray value of the image approaches saturation, and the fringe image is too bright and the contrast is poor.

On the other hand, the measurement technology of the specular objects is based on interference, such as a Michelson interferometer, or a Mach-zehnder interferometer. The measurements need to be executed in a stable environment, such as with low noise or no movement, and is limited by the interference range of the interferometer. Thus the measurement is inconvenient for measuring large objects or specular objects with a discontinuous surface.

As a result, it is necessary to provide a topographical measurement system for a specular object to solve the problems existing in the conventional technologies, as described above.

SUMMARY OF THE INVENTION

A primary object of the present invention is to provide a topographical measurement system for a specular object, wherein all of the fringe patterns projected onto the specular object can be captured and calculated by the equations of the rotated angles and phase differences.

A secondary object of the present invention is to provide a topographical measurement method for a specular object, the topographical measurement system according to the present invention is measured by the various phase differences corresponded the pixel, and thus the topographical measurement system is not influenced by noise and movement.

To achieve the above object, the present invention provides a topographical measurement system for a specular object which comprises a screen, an image capturing device, and an image processing device; the screen includes a display plane and a fringe pattern, wherein the fringe pattern is displayed on the display plane, the specular object includes a to-be-measured surface arranged corresponding to the display plane, and the fringe pattern is projected onto the to-be-measured surface of the specular object to form a virtual image; the image capturing device is opposite to the to-be-measured surface of the specular object for capturing the virtual image; the image processing device electrically connects to the image capturing device for calculating a surface profile of the to-be-measured surface according to the virtual image.

In one embodiment of the present invention, the topographical measurement system further includes a light source disposed adjacent to the screen or behind the image capturing device.

In one embodiment of the present invention, an area of the to-be-measured surface is smaller than that of the display plane of the screen.

In one embodiment of the present invention, the fringe pattern includes a plurality of longitudinal gradient bright fringes and a plurality of longitudinal gradient dark fringes, and wherein the longitudinal gradient bright fringes and the longitudinal gradient dark fringes are arranged alternately.

In one embodiment of the present invention, the longitudinal gradient bright fringes and the longitudinal gradient dark fringes are interlaced with the transversal gradient bright fringes and the transversal gradient dark fringes.

To achieve the above object, the present invention provides a topographical measurement method for a specular object, which comprises steps of: a preparation step for forming a fringe pattern on a display plane of a screen; a first projection step for projecting the fringe pattern onto a to-be-measured surface of the specular object to reflect and form a first virtual image; a first capture step for capturing the first virtual image by an image capturing device, and transmitting the first virtual image to an image processing device; a second projection step for turning the specular object with a rotated angle, and projecting the fringe pattern onto the to-be-measured surface of the specular object again to reflect and form a second virtual image; a second capture step for capturing the second virtual image by the image capturing device, and transmitting the second virtual image to the image processing device; and a processing step for comparing the first virtual image with the second virtual image by the image processing device, and thus obtaining a surface profile of the to-be-measured surface.

In one embodiment of the present invention, the surface profile of the to-be-measured surface is obtained by calculating the rotated angle and a phase difference between the first virtual image and the second virtual image in the processing step.

In one embodiment of the present invention, the topographical measurement method further comprises a correction step after the preparation step, and the correction step is to turn a flat mirror with a plurality of different rotated angles, for reflecting the fringe pattern in turn, so as to form a plurality of virtual correction images, and a relationship equation is obtained according the rotated angles and a phase difference between the virtual correction images.

In one embodiment of the present invention, the rotated angles to which the flat mirror is turned related to a plane parallel to the display plane of the screen are ranged from 45 degrees to −45 degrees.

In one embodiment of the present invention, an area of the flat mirror is smaller than that of the display plane of the screen.

As stated above, the topographical measurement system according to the present invention is improved from the traditional fringe projection profiler, and all of the fringe pattern projected onto the specular object can be captured and calculated by the equations of the rotated angles and phase differences to avoid that a part of the image is too bright, and the poor contrast. Thus the whole of the specular object can be measured without vertical scanning and depth zoom. Furthermore, the topographical measurement system according to the present invention is measured by the various phase differences corresponding to the pixels, thus the topographical measurement system is not influenced by noise and movement, and large objects or the specular objects with a discontinuous surface are also measured through the topographical measurement system

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

Figure 1:
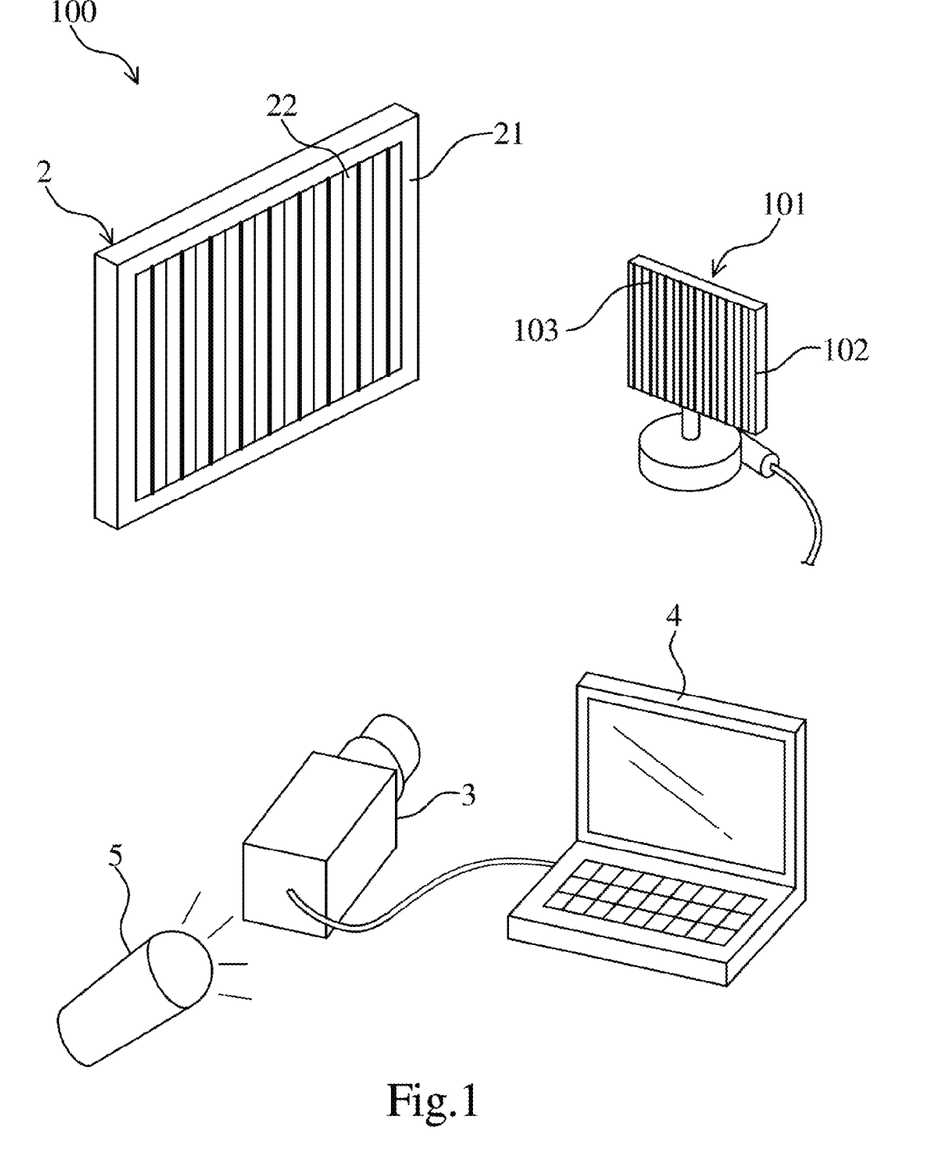
FIG. 1 is a schematic view of a topographical measurement system measured by a flat mirror according to a preferred embodiment of the present invention.

Refer to FIG. 1, a topographical measurement system 100 for specular objects 101, 101', such as a metal object or a mirror, according to a preferred embodiment of the present invention is illustrated. As shown, the topographical measurement system 100 comprises a screen 2, an image capturing device 3, an image processing device 4, and a light source 5. The detailed structure of each component, assembly relationships and principle of operation in the present invention will be described in detail hereinafter.

Refer still to FIG. 1, the screen 2 includes a display plane 21 and a fringe pattern 22, wherein the fringe pattern 22 is displayed on the display plane 21. The specular object 101 includes a to-be-measured surface 102 arranged corresponding to the display plane 21, and the fringe pattern 22 is projected onto the to-be-measured surface 102 of the specular object 101 to reflect and form a corrected virtual image 103.

Figure 2:
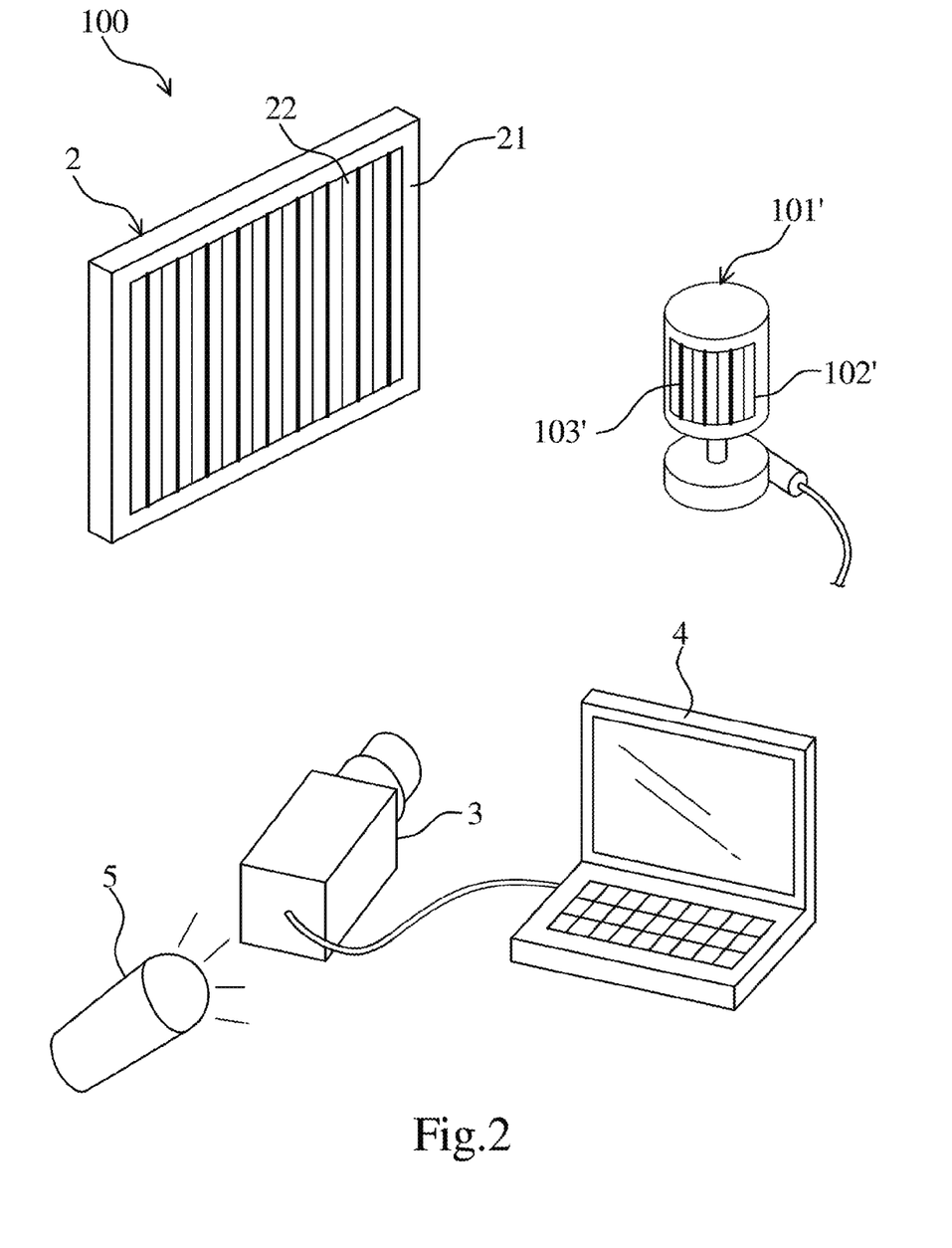
FIG. 2 is a schematic view of the topographical measurement system measured by a inspected object according to the preferred embodiment of the present invention.

Refer to FIGS. 1 and 2, when the topographical measurement system 100 is corrected by a specular object 101 which is a flat mirror, and the corrected virtual image 103 is formed on the to-be-measured surface 102 of the specular object 101 the in FIG. 1. When the topographical measurement system 100 is measured by a specular object 101' which is an inspected object, and a virtual image 103' is formed on the to-be-measured surface 102' of the specular object 101' in FIG. 2.

Refer still to FIGS. 1 and 2, an area of the to-be-measured surface 102 of the specular object 101 (flat mirror), and an area of the to-be-measured surface 102' of the specular object 101' (inspected object) are smaller than an area of the display plane 21 of the screen 2 in the preferred embodiment of the present invention. The fringe pattern 22 includes a plurality of longitudinal gradient bright fringes and a plurality of longitudinal gradient dark fringes, and wherein the longitudinal gradient bright fringes and the longitudinal gradient dark fringes are arranged alternately. The topographical measurement system 100 can be measured through a two-dimensional change (X-axis and Z-axis) of the longitudinal gradient bright fringes and the longitudinal gradient dark fringes of the corrected virtual image 103 and the virtual images 103' projected onto the to-be-measured surfaces 102, 102' in FIGS. 3 and 4.

Figure 8:
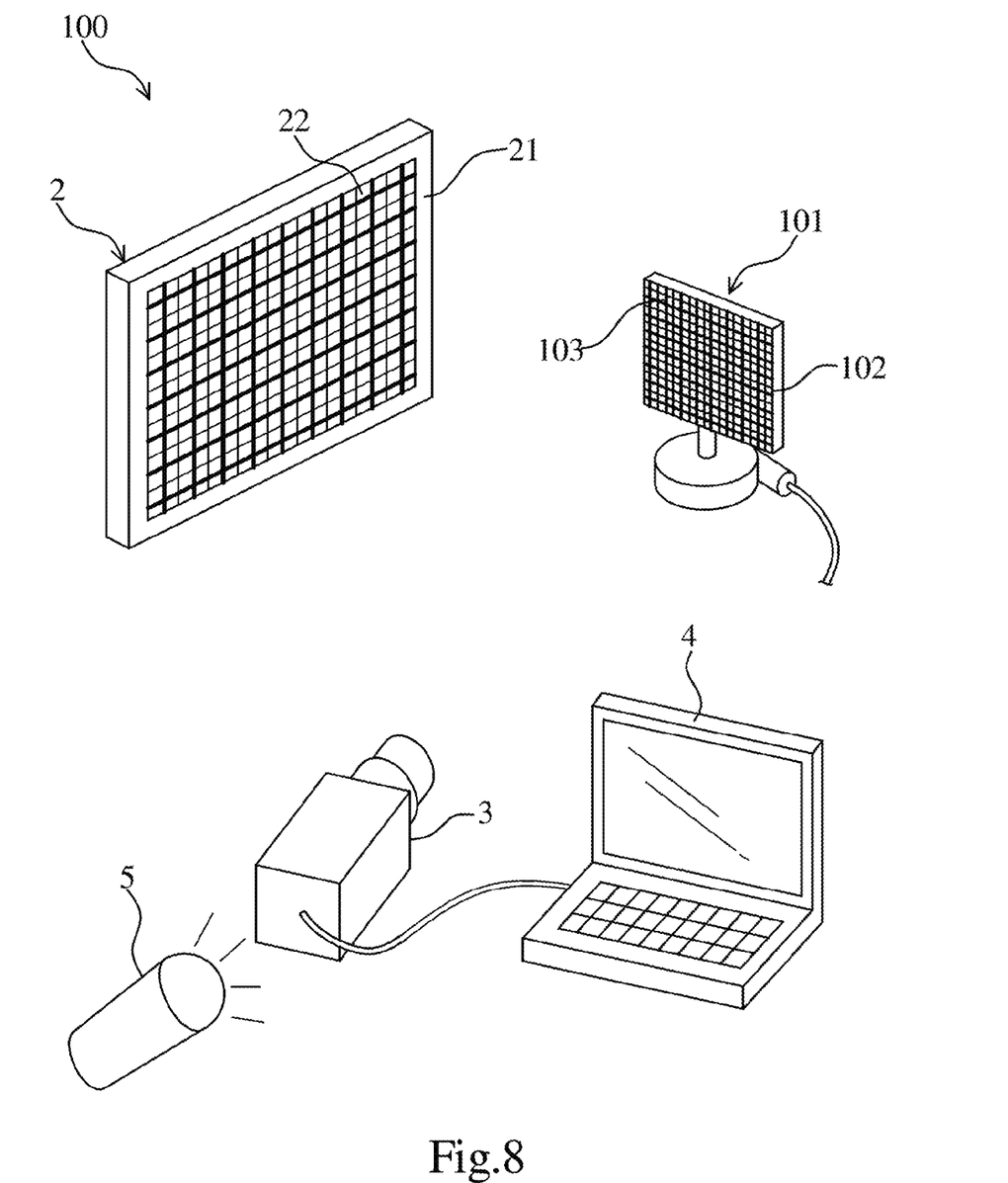
FIG. 8 is a schematic view of a topographical measurement system measured by a flat mirror according to another preferred embodiment of the present invention.
Figure 9:
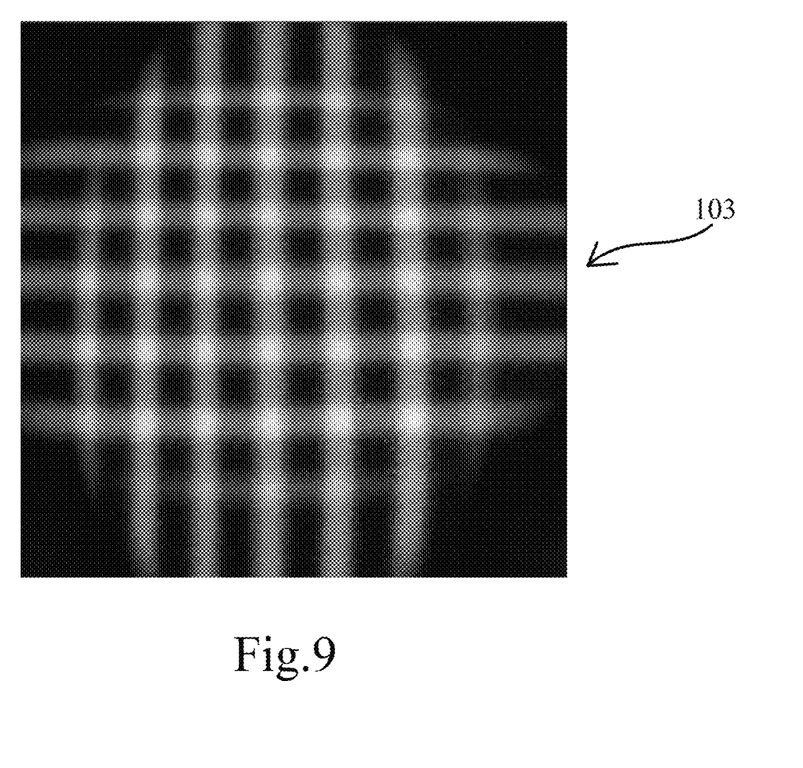
FIG. 9 is a virtual correction image of the topographical measurement system measured by the flat mirror according to the preferred embodiment of the present invention in FIG. 8.

In another embodiment, the fringe pattern 22 further includes a plurality of transversal gradient bright fringes and a plurality of transversal gradient dark fringes, and wherein the transversal gradient bright fringes and the transversal gradient dark fringes are arranged alternately, and the longitudinal gradient bright fringes and the longitudinal gradient dark fringes are interlaced with the transversal gradient bright fringes and the transversal gradient dark fringes. The topographical measurement system 100 can be measured through a three-dimensional change of the longitudinal gradient bright fringes, the longitudinal gradient dark fringes, the transversal gradient bright fringes, and the transversal gradient dark fringes projected onto the to-be-measured surfaces 102 in FIGS. 8 and 9.

Refer still to FIGS. 1 and 2, the image capturing device 3 is opposite to the to-be-measured surfaces 102, 102' of the specular objects 101, 101', so that the image capturing device 3 faces the to-be-measured surfaces 102, 102' and captures the corrected virtual image 103 and the virtual image 103' to execute the subsequent analysis of the corrected virtual image 103 and the virtual image 103'.

Refer still to FIGS. 1 and 2, the image processing device 4 electrically connects to the image capturing device 3 for calculating a surface profile of the to-be-measured surfaces 102, 102' of the specular objects 101, 101' according to the corrected virtual image 103 and the virtual image 103'.

Refer still to FIGS. 1 and 2, the light source 5 is disposed behind the image capturing device 3 to improve a clarity of the image capturing device 3 for capturing the corrected virtual image 103 and the virtual image 103'. In another embodiment, the light source 5 is also disposed adjacent to the screen 5, such as in the screen 5, behind the screen 5, or above the screen 5, so that the light for projecting the fringe pattern 22 can be increased. The location of the light source 5 is not limited in the preferred embodiment of the present invention.

Figure 3:
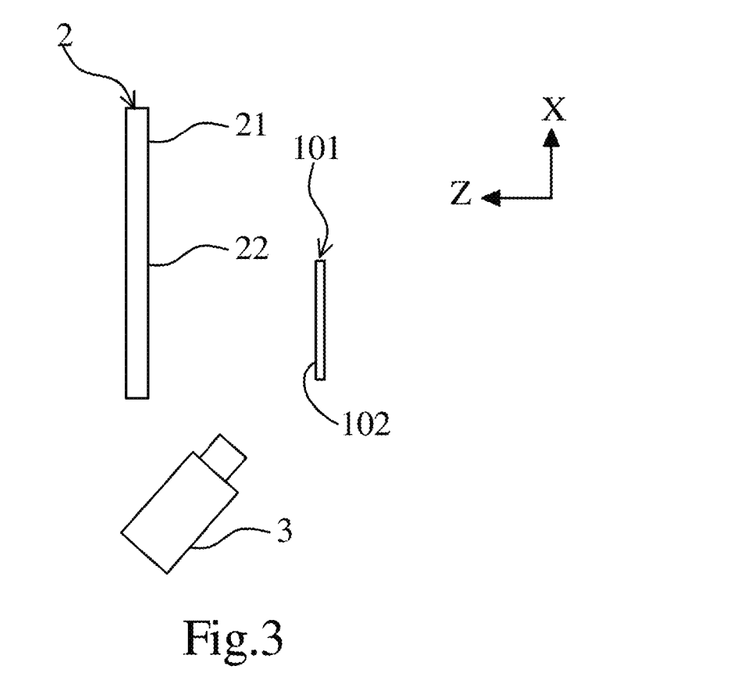
FIG. 3 is a schematic view of the topographical measurement system measured by the flat mirror turned relative to a plane parallel to a display plane of the screen with 0 degrees according to the preferred embodiment of the present invention.
Figure 4:
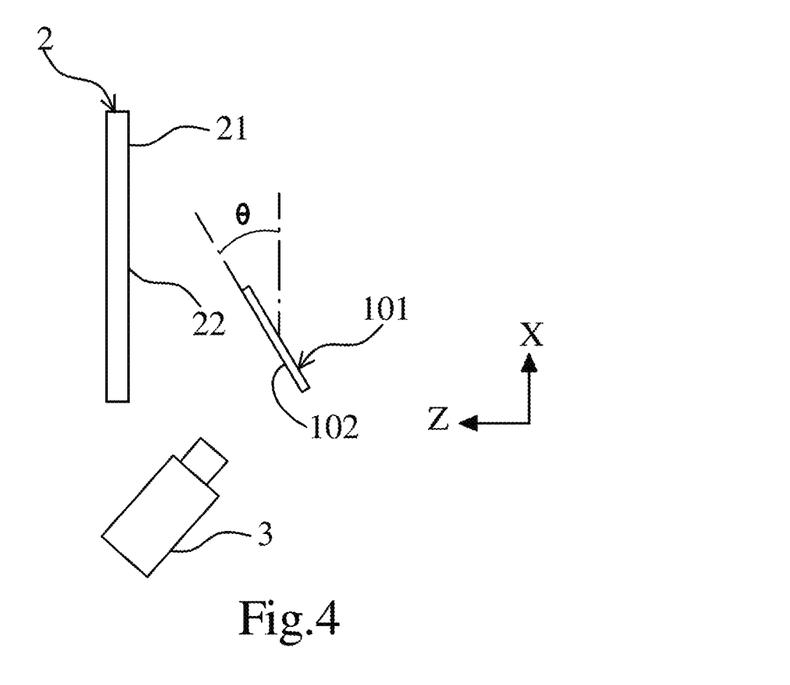
FIG. 4 is a schematic view of the topographical measurement system measured by the flat mirror turned relative to the plane parallel to the display plane of the screen with θ degrees according to the preferred embodiment of the present invention.

As described above, first, the specular object 101 is disposed which is a flat mirror, and turned related to a plane parallel to the display plane 21 of the screen 2 with a numbers of rotated angles θ to form the corrected virtual images 103 in FIGS. 3 and 4. Then the corresponding phase maps of the corrected virtual images 103 are calculated by the Fourier transform method, and a database, which identifies the virtual images 103 of the rotated angles θ with various phase differences, is built. With the database, the equations of the rotated angles θ and phase differences φ can be determined.

Figure 7A:
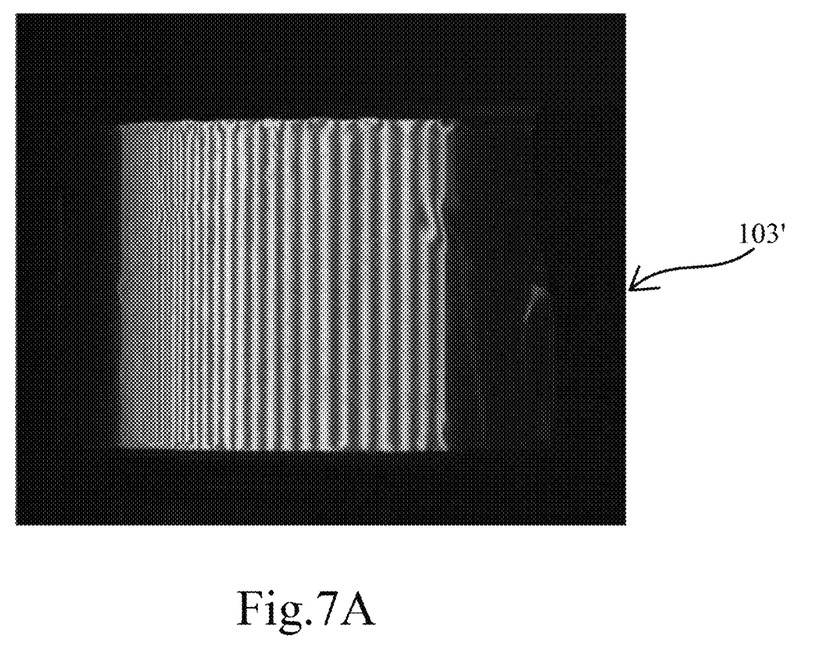
FIGS. 7A to 7B are a first virtual image and a second virtual image of a topographical measurement method according to the preferred embodiment of the present invention.

The specular object 101 (flat mirror) is replaced by a specular object 101' (inspected object), and the fringe pattern 22 is projected onto a to-be-measured surface 102' of the specular object 101' to form a first virtual image 103' in FIG. 7A. Then, the specular object 101' is turned with a rotated angle θ, and the fringe pattern 22 is reflected onto the to-be-measured surface 102' of the specular object 101' to form a second virtual image 103' in FIG. 7B. The first virtual image 103' and the second virtual image 103' are compared by the image processing device 4, and the rotated angles θ and the phase differences of the first virtual image 103' and the second virtual image 103' are calculated and identified to obtaining a surface profile of the to-be-measured surface 102'.

Figure 7B:
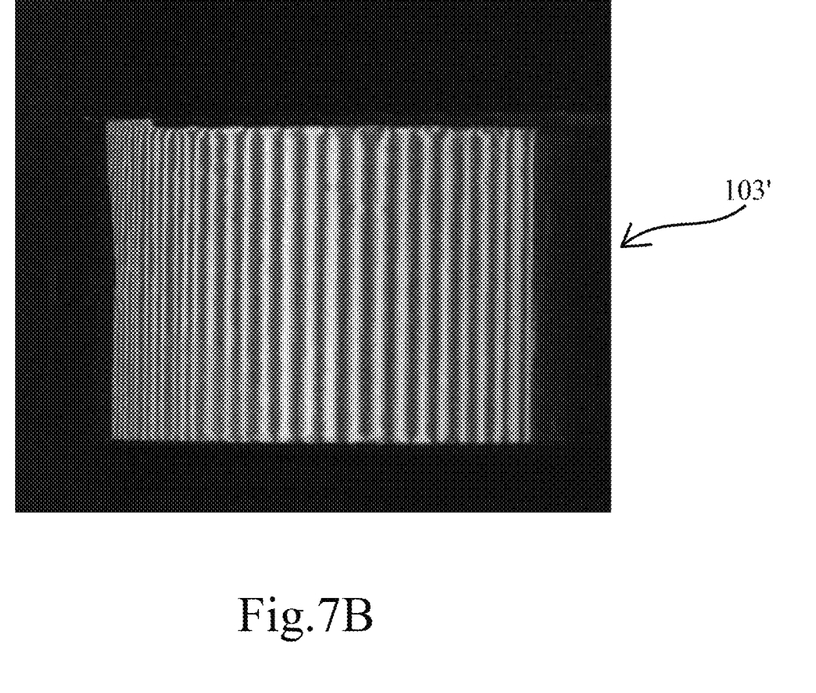

The first virtual image 103' and the second virtual image 103' of the fringe pattern 22 is formed behind the specular object 101'. Fringes on the first virtual image 103' and the second virtual image 103' are deformed by topography of the specular object 101'. Thus, phase differences of the deformed fringes between the first virtual image 103' and the second virtual image 103' is desirable to retrieve the surface profile of the specular object 101'.

As stated above, the topographical measurement system 100 according to the present invention is improved from the traditional fringe projection profiler, and all of the fringe pattern 22 projected onto the specular object 101' can be captured and calculated by the equations of the rotated angles θ and phase differences φ to avoid a part of the image being too bright, and also avoid poor contrast. Thus the whole of the specular object 101' can be measured without vertical scanning and depth zoom. Furthermore, the topographical measurement system 100 according to the present invention is measured by the various phase differences corresponded the pixels, thus the topographical measurement system 100 is not influenced by noise and movement, and large objects or specular objects with a discontinuous surface are also measured through the topographical measurement system 100.

Figure 5:
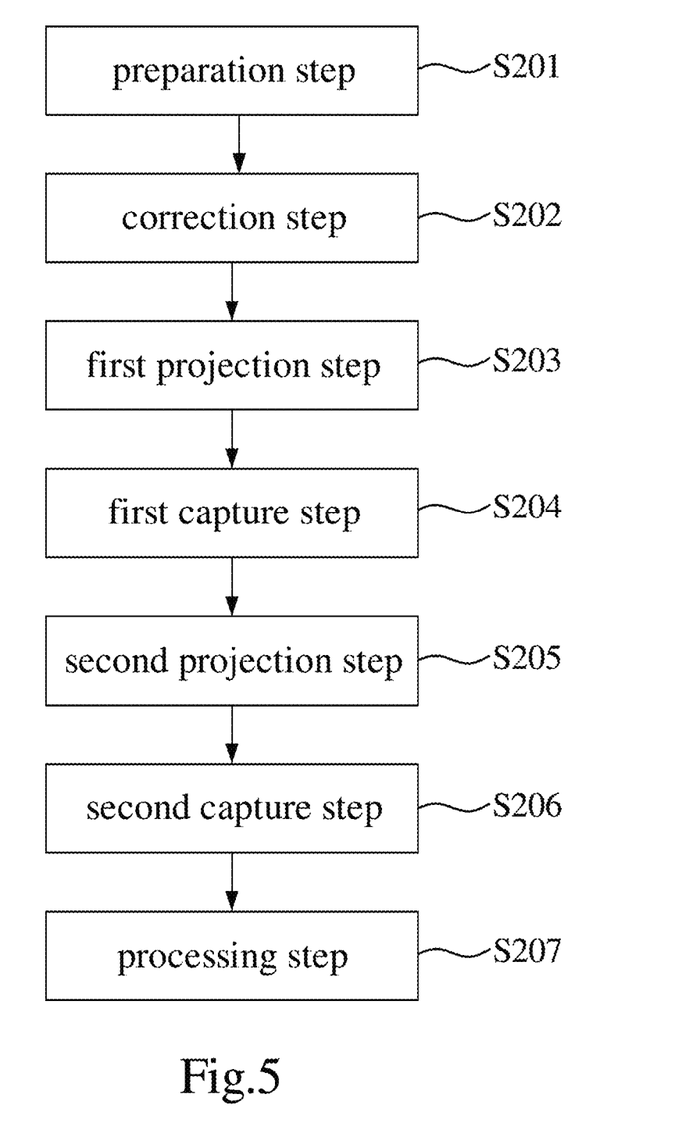
FIG. 5 is a flowchart of a topographical measurement method according to a preferred embodiment of the present invention.

Refer to FIG. 5 with reference FIGS. 1 and 2, a topographical measurement method through said topographical measurement system 100 topographical measurement the specular object 101, 101' according to a preferred embodiment of the present invention is illustrated. As shown, the topographical measurement method comprises a preparation step S201, a correction step S202, a first projection step S203, a first capture step S204, a second projection step S205, a second capture step S206, and a processing step S207.

Refer to FIG. 5 with reference FIG. 1, forming a fringe pattern 22 on a display plane 21 of a screen 2 in the preparation step S201, wherein the fringe pattern 22 includes a plurality of longitudinal gradient bright fringes and a plurality of longitudinal gradient dark fringes, and wherein the longitudinal gradient bright fringes and the longitudinal gradient dark fringes are arranged alternately. Furthermore, the fringe pattern 22 further includes a plurality of transversal gradient bright fringes and a plurality of transversal gradient dark fringes, and wherein the transversal gradient bright fringes and the transversal gradient dark fringes are arranged alternately, and the longitudinal gradient bright fringes and the longitudinal gradient dark fringes are interlaced with the transversal gradient bright fringes and the transversal gradient dark fringes in another embodiment.

Figure 6A:
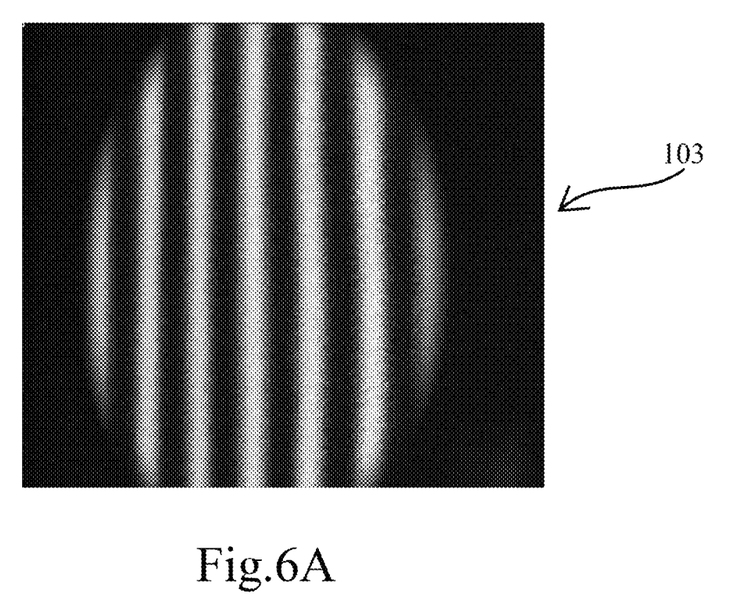
FIGS. 6A to 6E are a plurality of virtual correction images of the topographical measurement method measured by the flat mirror turned to different rotated angles according to the preferred embodiment of the present invention.
Figure 6B:
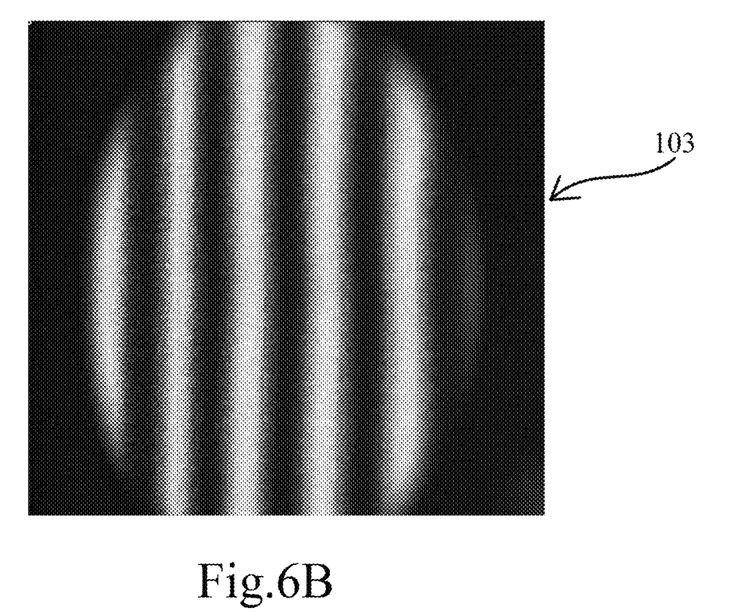
Figure 6C:
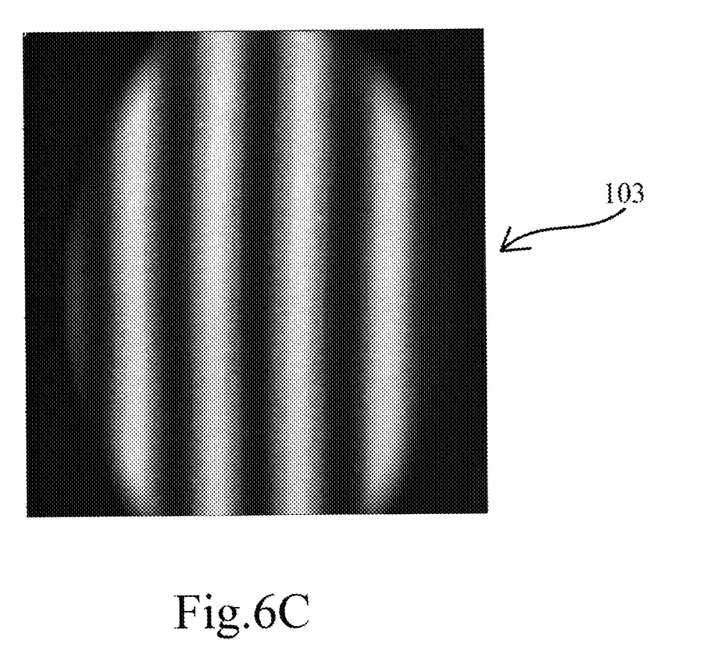
Figure 6D:
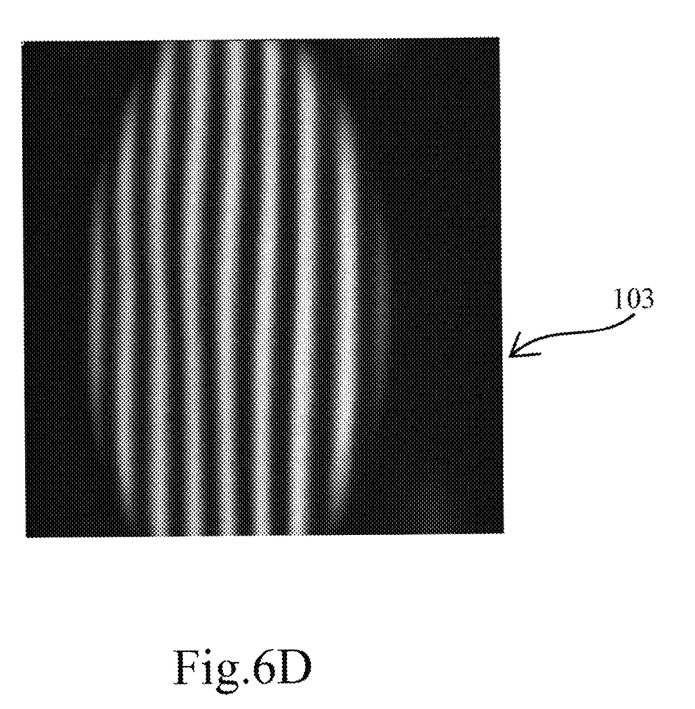
Figure 6E:
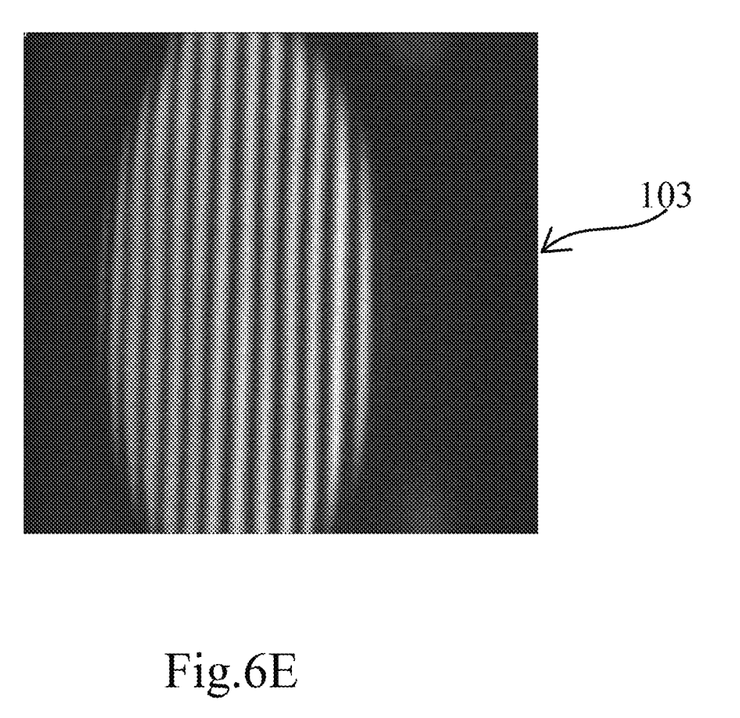

Refer to FIG. 5 with reference FIGS. 1, 3, and 4, in the correction step S202, the topographical measurement system 100 is corrected by a specular object 101 which is a flat mirror and parallel to the display plane 21 of the screen 2, that is, a rotated angle θ which a to-be-measured surface 102 of the specular object 101 (flat mirror) is turned relative to a plane parallel to the display plane 21 of the screen 2 is 0 degrees in FIG. 3. Furthermore, the rotated angles θ which the flat mirror is turned relative to the plane parallel to the display plane 21 of the screen 2 are also ranged from 10 degrees to −10 degrees in FIGS. 1 and 4, such as 10 degrees, 5 degrees, 0 degrees, −5 degrees, and −10 degrees, or 45 degrees to −45 degrees, such as 45, 40, 35, 30, 25. 20, 15, 10 degrees, 5 degrees, 0 degrees, −5 degrees, and −45, −40, −35, −30, −25, −20, −15, −10 degrees, so that the fringe pattern 22 displayed on the display plane 21 can be projected onto the to-be-measured surface 102 to reflect and form virtual images 103 respectively. For example, a virtual image 103 is formed when the rotated angle θ is 0 degrees in FIG. 6A, a virtual image 103 is formed when the rotated angle θ is 5 degrees in FIG. 6B, a virtual image 103 is formed when the rotated angle θ is 10 degrees in FIG. 6C, a virtual image 103 is formed when the rotated angle θ is −5 degrees in FIG. 6D, and a virtual image 103 is formed when the rotated angle θ is −10 degrees in FIG. 6E.

The virtual images 103 are observed by the image capturing device 3 (CCD camera), and the virtual images 103 containing fringe information was obtained. In this virtual images 103, phase of the fringes can be extracted with the Fourier transform method. By turning the specular object 101 (flat mirror), a number of virtual images 103 with various fringe periods are extracted. FIGS. 6A to 6E shows appearances of fringe distributions of the virtual images 103 with various rotated angles θ. It is found that the fringe period or the phase difference between two adjacent pixels is related to the rotated angle θ. In other words, searching for the rotated angle θ becomes a problem of finding the phase difference between two adjacent pixels. The corresponding phase maps of the virtual images 103 are calculated, and these measurements are repeated more than 10 times. Therefore a database, which identifies the virtual images 103 of the rotated angles θ with various phase differences, is built. With the database, the equations of the rotated angles θ and phase differences ϕ can be determined by means of the curve-fitting algorithm. ϕ=−0.0078 θ+0.0533 at θ<0, and ϕ=−0.0023 θ+0.0558 at θ>0.

| rotated angle θ | phase difference ϕ |
| --- | --- |
| 10 degrees | 0.034 |
| 5 degrees | 0.042 |
| 0 degrees | 0.057 |
| −5 degrees | 0.085 |
| −10 degrees | 0.135 |

It should be noted that the rotated angles θ to which the to-be-measured surface 102 of the specular object 101 (flat mirror) are turned relative to a plane parallel to the display plane 21 of the screen 2 are ranged from 10 degrees to −10 degrees, and an area of the flat mirror is smaller than that of the display plane of the screen in preferred embodiment of the present invention.

Refer to FIG. 5 with reference FIG. 2, in the first projection step S203, the specular object 101 (flat mirror) is replaced by a specular object 101' (inspected object), and the fringe pattern 22 is projected onto a to-be-measured surface 102' of the specular object 101' to reflect and form a first virtual image 103' in FIG. 7A.

Refer to FIG. 5 with reference FIG. 2, in the first capture step S204, the first virtual image 103' is captured by an image capturing device 3, and the first virtual image 103' is transmitted to an image processing device 4.

Refer to FIG. 5 with reference FIG. 2, in the second projection step S205, the specular object 101' is turned with a rotated angle θ, and the fringe pattern 22 is projected onto a to-be-measured surface 102' of the specular object 101' to reflect and form a second virtual image 103' in FIG. 7B.

Refer to FIG. 5 with reference FIG. 2, in the second capture step S206, the second virtual image 103' is captured by the image capturing device 3, and the second virtual image 103' is transmitted to the image processing device 4.

Refer to FIG. 5 with reference FIG. 2, in the processing step S207, the first virtual image 103' in FIG. 7A and the second virtual image 103' in FIG. 7B are compared by the image processing device 4, and the rotated angles θ and the phase differences of the first virtual image 103' in FIG. 7A and the second virtual image 103' in FIG. 7B are calculated and identified to obtain a surface profile of the to-be-measured surface 102'.

It is further illustrated that, when performing the profile measurement of the topographical measurement method, the various phase differences is obtained from the surface profile from the first virtual image 103' and the second virtual image 103' through the Fourier transform method. Rotated angle θ of each pixel is therefore identified with the phase difference. As a result, the slope of the profile can be determined, and is expressed as:

$$\tan\theta = \frac{\Delta z}{\Delta x}$$

where Δx is the sampling distance between two pixels along X-axis, and Δz is the sampling distance along Z-axis, wherein an actual size of one pixel is 0.06 cm. Thus, the surface profile of the to-be-measured surface 102' can be calculated by the sum of Δz.

As stated above, the topographical measurement system 100 according to the present invention is improved from the traditional fringe projection profiler, and all of the fringe patterns 22 projected onto the specular object 101' can be captured and calculated by the equations of the rotated angles θ and phase differences ϕ to avoid a part of the image being too bright, and also avoid poor contrast. Thus the whole of the specular object 101' can be measured without vertical scanning and depth zoom. Furthermore, the topographical measurement system 100 according to the present invention is measured by the various phase differences corresponded the pixel, thus the topographical measurement system 100 is not influenced by noise and movement, and large objects or specular object with a discontinuous surface are also measured through the topographical measurement system 100.

The present invention has been described with preferred embodiments thereof and it is understood that many changes and modifications to the described embodiments can be carried out without departing from the scope and the spirit of the invention that is intended to be limited only by the appended claims.

What is claimed is:

1. A topographical measurement system for a specular object, comprising:
   a screen including a display plane and a fringe pattern, wherein the fringe pattern is displayed on the display plane, the specular object includes a to-be-measured surface arranged corresponding to the display plane, and the fringe pattern is projected onto the to-be-measured surface of the specular object to reflect and form a virtual image;
   an image capturing device opposite the to-be-measured surface of the specular object for capturing the virtual image; and
   an image processing device electrically connected to the image capturing device for calculating a surface profile of the to-be-measured surface according to the virtual image.

2. The topographical measurement system according to claim 1, wherein the topographical measurement system further includes a light source disposed adjacent to the screen or behind the image capturing device.

3. The topographical measurement system according to claim 1, wherein an area of the to-be-measured surface is smaller than that of the display plane of the screen.

4. The topographical measurement system according to claim 1, wherein the fringe pattern includes a plurality of longitudinal gradient bright fringes and a plurality of longitudinal gradient dark fringes, and wherein the longitudinal gradient bright fringes and the longitudinal gradient dark fringes are arranged alternately.

5. The topographical measurement system according to claim 4, wherein the fringe pattern further includes a plurality of transversal gradient bright fringes and a plurality of transversal gradient dark fringes, and wherein the transversal gradient bright fringes and the transversal gradient dark fringes are arranged alternately.

6. The topographical measurement system according to claim 5, wherein the longitudinal gradient bright fringes and the longitudinal gradient dark fringes are interlaced with the transversal gradient bright fringes and the transversal gradient dark fringes.

7. A topographical measurement method for a specular object, comprising steps of:
- a preparation step for forming a fringe pattern on a display plane of a screen;
- a first projection step for projecting the fringe pattern onto a to-be-measured surface of the specular object to reflect and form a first virtual image;
- a first capture step for capturing the first virtual image by an image capturing device, and transmitting the first virtual image to an image processing device;
- a second projection step for turning the specular object with a rotated angle, and projecting the fringe pattern onto the to-be-measured surface of the specular object again to reflect and form a second virtual image;
- a second capture step for capturing the second virtual image by the image capturing device, and transmitting the second virtual image to the image processing device; and
- a processing step for comparing the first virtual image with the second virtual image by the image processing device, and thus obtaining a surface profile of the to-be-measured surface.

8. The topographical measurement method according to claim 7, wherein the surface profile of the to-be-measured surface is obtained by calculating the rotated angle and a phase difference between the first virtual image and the second virtual image in the processing step.

9. The topographical measurement method according to claim 7, wherein the topographical measurement method further comprises a correction step after the preparation step, and the correction step is to turn a flat mirror with a plurality of different rotated angles, for reflecting the fringe pattern in turn, so as to form a plurality of virtual correction images, and a relationship equation is obtained according the rotated angles and a phase difference between the virtual correction images.

10. The topographical measurement method according to claim 9, wherein the rotated angles to which the flat mirror is turned related to a plane parallel to the display plane of the screen are ranged from 45 degrees to −45 degrees.

11. The topographical measurement method according to claim 9, wherein an area of the flat mirror is smaller than that of the display plane of the screen.

12. The topographical measurement method according to claim 7, wherein the topographical measurement system further includes a light source disposed adjacent to the screen or behind the image capturing device.

13. The topographical measurement method according to claim 7, wherein an area of the to-be-measured surface is smaller than that of the display plane of the screen.

14. The topographical measurement method according to claim 7, wherein the fringe pattern includes a plurality of longitudinal gradient bright fringes and a plurality of longitudinal gradient dark fringes, and wherein the longitudinal gradient bright fringes and the longitudinal gradient dark fringes are arranged alternately.

15. The topographical measurement method according to claim 14, wherein the fringe pattern further includes a plurality of transversal gradient bright fringes and a plurality of transversal gradient dark fringes, and wherein the transversal gradient bright fringes and the transversal gradient dark fringes are arranged alternately.

16. The topographical measurement method according to claim 15, wherein the longitudinal gradient bright fringes and the longitudinal gradient dark fringes are interlaced with the transversal gradient bright fringes and the transversal gradient dark fringes.

* * * * *